July 25, 1967 S. A. BUSSARD 3,332,107
FOODSTUFFS MEASURING AND DISPENSING DEVICES
Filed Sept. 6, 1966

INVENTOR.
SHERMAN A. BUSSARD
BY
*Harry C. Nieuwens*
ATTORNEY

United States Patent Office
3,332,107
Patented July 25, 1967

3,332,107
FOODSTUFFS MEASURING AND DISPENSING
DEVICES
Sherman A. Bussard, Westminster, Calif., assignor to
Scott's Hotel and Restaurant Supply Company, Orange,
Calif., a corporation of California
Filed Sept. 6, 1966, Ser. No. 577,317
10 Claims. (Cl. 17—32)

ABSTRACT OF THE DISCLOSURE

This invention pertains to a device for forming meat patties which are of predetermined shape, size and compaction. It teaches the use of through openings in a generally cup-shaped member for preventing compacting of the meat upon filling. Also, a unique dispensing arrangement in the form of a movable rear wall is provided, such rear wall having mounting means disposed at an angle to the dispensing movement of meat or foodstuffs employed therein. Such rear wall is rectilinearly movable in a direction disposed at an angle to the dispensing movement of the foodstuffs.

The present invention relates generally to foodstuffs measuring and dispensing devices, and more particularly to means for dispensing predetermined portions of meat or other foodstuffs.

Within recent years, merchandising has become a very sophisticated and important aspect of selling a product at a profit. With respect to the restaurant business where food must be prepared and served at a profit, the amount of food which is served or dispensed for a given price becomes extremely critical.

This is particularly so with respect to small restaurants or food dispensing organizations, since profit may depend largely upon the dispensing of the proper quantity of food for each item sold.

Although the size of the portion is important, it is not the sole factor in making a profit. The labor necessary to make the food product is relatively expensive and therefore should be held to a minimum.

Devices heretofore available for portioning food have not been entirely satisfactory. Such prior devices have not consistently provided the same portion of food and they have not been sufficiently flexible to enable the proprietor or operator to vary the size of the portion at will.

The foregoing problems have been particularly apparent in restaurants and other food dispensing establishments which sell tacos and other products having meat patties formed of ground beef and the like.

It is an object of the present invention to provide a foodstuffs measuring and dispensing device which can be operated in a quick and efficient manner to consistently dispense a predetermined quantity of food.

Another object of the present invention is to provide a foodstuffs measuring and dispensing device as characterized above, which is adjustable so that the size of the portion being formed can be varied as desired.

A further object of the present invention is to provide a foodstuffs measuring and dispensing device as characterized above, which can be operated manually and does not require exception al skill or long training of the operator.

Another further object of the present invention is to provide a foodstuffs measuring and dispensing device as characterized above, having dispensing means for shaping the food into a patty of the proper shape and size.

A still further object of the present invention is to provide a foodstuffs measuring and dispensing device as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
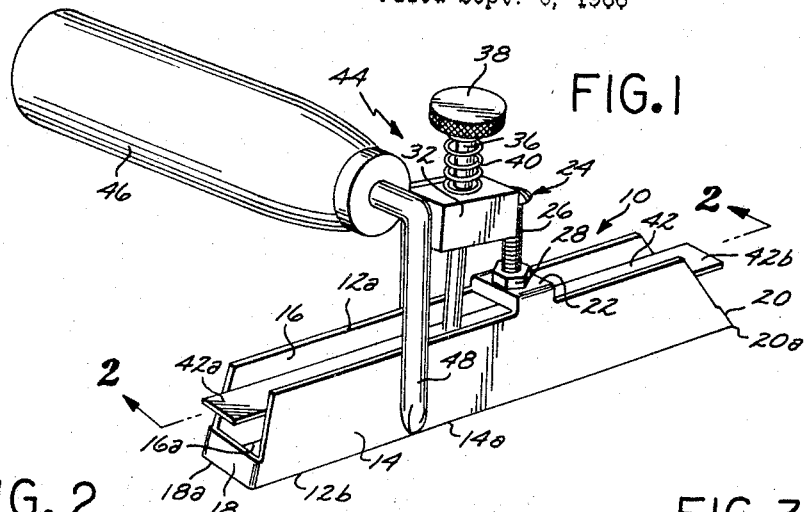
FIGURE 1 is a perspective view of a device according to the present invention.

Referring to the drawings there is shown therein, a measuring and dispensing device 10 according to the present invention. Such device comprises a generally cup-shaped member 12 having relatively flat opposite side walls 14 and 16 which are held in spaced relation by relatively small end walls 18 and 20. Cup-shaped member 12 may be formed of any appropriate material such as metal, plastic or the like. Side walls 14 and 16 are angularly disposed with respect to each other so as to provide cup-shaped member 12 with tapered side walls which vary from a small dimension at the upper end 12a to a large dimension at the dispensing end 12b. That is, the cup-shaped member 12 is thereby outwardly tapered from the top to the bottom as shown in the drawings.

Figure 2:
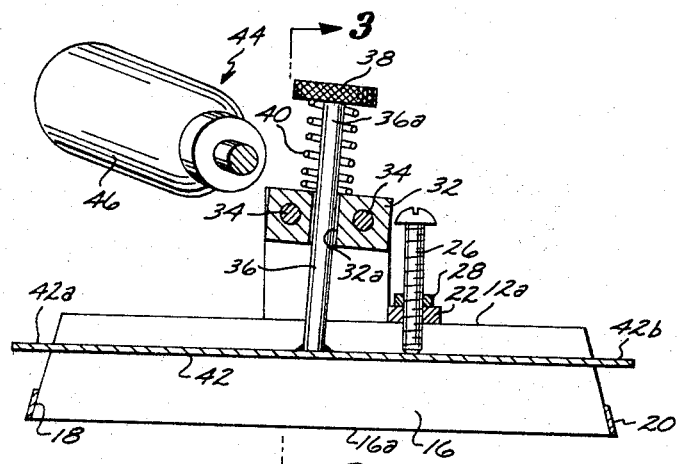
FIGURE 2 is a sectional view of the device of FIGURE 1, taken substantially along line 2—2.
Figure 3:
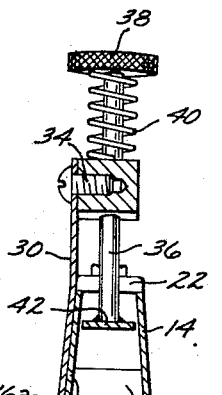
FIGURE 3 is a transverse sectional view, taken substantially along line 3—3 of FIGURE 2.
Figure 4:
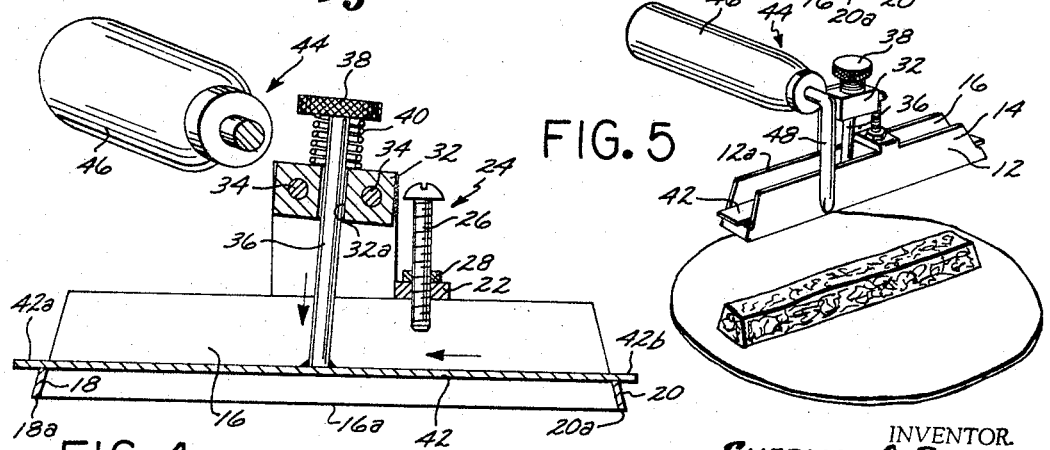
FIGURE 4 is a sectional view similar to FIGURE 2 showing the device in dispensing position.

End walls 18 and 20 are positioned to have an edge 18a and 20a, respectively, coplanar with the lower edges 14a and 16a of the side walls. Such end walls are also tapered outwardly as shown in FIGURES 2 and 4 of the drawings for purposes which will hereinafter be described.

A mounting tab 22 extends between the side walls 14 and 16 at the upper marginal edges thereof. Variable limit stop means 24, which may take substantially any desired form, is mounted in such tab 22. In the drawings, such limit stop means 24 is shown as comprising a bolt 26 threadedly positioned within a suitable opening in tab 22 and a locking nut 28 for anchoring the bolt 26 in any desired position.

Connected to side wall 16 as by welding, brazing or the like is a mounting plate 30. The upper end of such plate carries a bearing member 32, by means of fastening bolts 34.

Bearing member 32 is formed with a through opening 32a for slidably receiving a shaft 36. Mounted on the upper end 36a of shaft 36 is a button 38, and a compression spring 40 is interposed between such button and the bearing member 32.

Attached to the lower end of shaft 36 is a movable rear wall member 42 for the cup-shaped member 12. Such member 42 extends beyond the opposite ends of member 12 as shown at 42a and 42b. Also, member 42 is of such width as to be movable within the member 12 without engaging the side walls 14 and 16.

It should be particularly noted that bearing member 32 is mounted on plate 30 such that the through opening 32a is not at right angles to the length of cup-shaped member 12. Rather, such bearing member 32 is so mounted that the axis of opening 32a forms an acute angle with the plane of the edges 14a, 16a, 18a and 20a of the cup-shaped member. The shaft or rod 36, in like manner is welded to rear wall member 42 at substantially the same acute angle. That is, such wall 42 is parallel to the aforementioned plane of the edges of the side and end walls, so that the shaft 36 is at an acute angle thereto.

Handle means 44 comprising a handle 46, to be gripped by the operator, and a mounting rod 48 is provided. The mounting rod 48 is bent at an angle and is welded to the side wall 14 in the position shown. The handle 46, of course, is to be gripped by the operator using the subject measuring and dispensing device.

When it is desired to utilize the subject device, it is merely necessary to initially adjust the limit stop means 24 to define the retracted position of rear wall 42 as shown most clearly in FIGURE 2 of the drawings. The compression spring 40, operating between bearing member 32 and button 38, constantly urges said rear wall 42 to its retracted position against the lower end of bolt 26.

In order to fill the cup-shaped member 12 with the foodstuffs, it is a simple matter for the operator to place the cup-shaped member over a relatively large quantity of such material. The foodstuffs may take substantially any desired form but the subject device is particularly useful in measuring and dispensing ground meat and the like.

By pushing the cup-shaped member 12 downward into the meat or against a side wall with the ground meat therebetween, the cup-shaped cavity of the member 12 is quickly filled. It should be noted that the end openings between the end walls and the rear wall 42 provide means for excess foodstuffs to pass out of the cup-shaped member 12. This enables the entire device to be pushed through the foodstuffs until the marginal edges 14a, 16a, 18a and 20a of the walls engage the flat surface immediately beneath or adjacent the quantity of food. Such surface is utilized to prevent any of the foodstuffs extending below or beyond the aforedescribed dispensing opening of the cup-shaped member. Such limitation on the amount of food extending beyond the opening of the member 12, it will be noted, is obtained without the need for firmly compressing the foodstuffs within the cup-shaped member. That is, by providing the end openings above the end walls 18 and 20, the foodstuffs does not become compacted, but rather it moves through the member 12 until the surface of the food at the dispensing opening is relatively flat and level.

Figure 5:
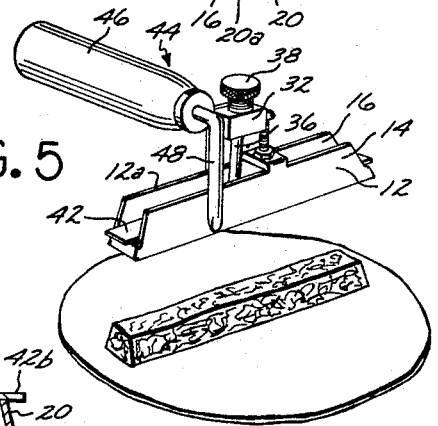
FIGURE 5 is a perspective view of the device after dispensing the foodstuffs.

Thereafter, as shown in FIGURE 5 of the drawings, the foodstuffs patty within the cup-shaped member 12 is dispensed by pushing downwardly on button 38. Such action, of course, causes rear wall 42 to move against the force of compression spring 40 thereby pushing the foodstuffs patty out of the cup-shaped member 12. However, it should be noted that the end walls 18 and 20 not only effectively cut off the excess foodstuffs extending through the end openings thereabove, but the outwardly tapered nature of such end walls moves the excess material away from the cup-shaped member 12. The upper edge of such end walls in cooperation with the rear wall 42 effectively cuts the excess foodstuffs away.

It also should be noted that the aforedescribed angular disposition of shaft 36 with respect to rear wall 42 provides not only a dispensing movement to the latter but also provides a lateral movement thereof. That is, as shown most clearly in FIGURE 4 of the drawings, the rear wall 42 is moved sidewise as it is moved downwardly to dispense the foodstuffs patty. Such composite motion effectively pushes the patty from the cup-shaped member 12, including the rear wall 42.

It is thus seen that the present invention provides a foodstuffs measuring and dispensing device which can be adjusted as desired to vary the size of the foodstuffs patty. Also, such device is operable to provide the same size and shape of patty without compacting the food to any extent. Such device, further, is easily operated and can be used in a quick and efficient manner to provide many patties in a short period of time.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A foodstuffs measuring and dispensing device comprising in combination, a generally cup-shaped member having a movable rear wall for urging foodstuffs through the forward opening in said member, and means forming at least one passageway in said cup-shaped member to permit passage therethrough of foodstuffs to prevent compaction of the latter on filling of said cup-shaped member, said movable rear wall cooperating with said passageway to sever said foodstuffs thereat upon urging of said foodstuffs from said member to thereby maintain uniform size, shape and compaction of the foodstuffs dispensed.

2. A foodstuffs measuring and dispensing device according to claim 1, wherein said rear wall comprises at least one extension which projects through the side wall of said cup-shaped member, said passageway being formed in said side wall adjacent said extension, whereby dispensing movement of said rear wall severs said foodstuffs against said side wall.

3. Foodstuffs measuring and dispensing device according to claim 1 wherein adjustable stop means is provided for controlling the initial position of said rear wall to thereby control the size of the foodstuffs dispensed.

4. Foodstuffs measuring and dispensing device according to claim 1 wherein said cup-shaped member is formed with a general taper from a given cross section at the initial position of said rear wall to a larger cross section at the forward opening in said cup-shaped member.

5. Foodstuffs measuring and dispensing device according to claim 1 wherein manual operating means is mounted on said cup-shaped member and is operatively connected to said rear wall to move the same from retracted position to simultaneously dispense said foodstuffs through said opening in said cup-shaped member and sever the foodstuffs at said passageway, and biasing means is provided for returning said rear wall to retracted position.

6. A foodstuffs measuring and dispensing device comprising in combination, a generally cup-shaped member formed with a forward opening through which food is dispensed, a rear wall for said cup-shaped member to be moved from a retracted position to a forward position for dispensing food in a given direction, and mounting means for said rear wall whereby movement of said rear wall from said retracted position causes said rear wall to also move laterally of said given direction to facilitate dispensing of said foodstuffs.

7. A foodstuffs measuring and dispensing device according to claim 6, wherein said mounting means comprises a mounting shaft carrying said rear wall and a bearing member fixed relative to said cup-shaped member at an angle to the said given direction of dispensing movement of the foodstuffs as defined by the shape of the cup-shaped member.

8. A foodstuffs measuring and dispensing device according to claim 7, wherein said bearing member restricts said mounting shaft to rectilinear movement along an axis disposed at a slight angle to the direction of dispensing movement of the foodstuffs to thereby cause said foodstuffs to be urged against the side wall of said cup-shaped member throughout said dispensing movement to cause said foodstuffs to be wiped from the rear wall.

9. A foodstuffs measuring and dispensing device according to claim 6 wherein said mounting means is adapted to maintain said rear wall normal to said given direction.

10. A foodstuffs measuring and dispensing device according to claim 7 wherein said bearing member is formed with an opening for receiving said mounting shaft and is disposed such that the axis of said opening forms an acute angle with said given direction, and manual operating means, cooperates with said shaft to effect rectilinear movement thereof within said opening in said bearing member to effect composite movement of said rear wall along said given direction and laterally thereof.

References Cited

UNITED STATES PATENTS

| | | | |
|---|---|---|---|
| 520,917 | 6/1894 | Eggeling | 31—11 |
| 1,639,937 | 8/1927 | Greener | 31—11 |
| 1,749,178 | 3/1930 | Berg | 17—32 |
| 2,008,725 | 7/1935 | Parker | 249—74 |
| 2,994,286 | 8/1961 | Mussari | 249—74 |

LUCIE H. LAUDENSLAGER, *Primary Examiner.*